(12) United States Patent
Ward et al.

(10) Patent No.: US 6,532,855 B1
(45) Date of Patent: *Mar. 18, 2003

(54) SAW BLADE HAVING DIMPLES FORMED BY PROCESS OF DEFORMING BLADE BODY

(75) Inventors: Kevin M. Ward, Louisville, KY (US); Gregory A. Phillips, LaGrange, KY (US); Manfred W. Schmidt, Louisville, KY (US)

(73) Assignee: Credo Tool Company, Woodburn, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/705,403

(22) Filed: Nov. 3, 2000

Related U.S. Application Data

(63) Continuation of application No. 09/136,676, filed on Aug. 19, 1998, now Pat. No. 6,145,426, which is a continuation-in-part of application No. 08/730,398, filed on Oct. 15, 1996, now Pat. No. 5,802,947.

(51) Int. Cl.[7] .............................................. B23D 47/00
(52) U.S. Cl. ........................................... 83/835; 76/112
(58) Field of Search ............................. 407/29.1, 29.13; 83/835, 837, 848, 855, 663, 592; 144/237, 236, 235, 240, 218; 76/112

(56) References Cited

U.S. PATENT DOCUMENTS

| | | | |
|---|---|---|---|
| 507,071 A | * | 10/1893 | Huff |
| 877,146 A | | 1/1908 | Ward |
| 1,434,295 A | | 10/1922 | Lang |
| 1,861,218 A | | 5/1932 | Huther |
| 1,964,290 A | | 6/1934 | Krause |
| 2,563,559 A | | 8/1951 | Sneva |
| 2,703,119 A | * | 3/1955 | Pullen |
| 2,810,190 A | * | 10/1957 | Schmidgall |
| 3,045,321 A | * | 7/1962 | McDermott |
| 3,162,187 A | | 12/1964 | Christensen |
| 3,314,456 A | | 4/1967 | Craven |
| 3,537,491 A | * | 11/1970 | Kolesh |
| 3,820,419 A | | 6/1974 | McLagan |
| 3,829,942 A | * | 8/1974 | Scott |
| 3,938,417 A | | 2/1976 | Nedsten |
| 4,027,390 A | | 6/1977 | Kendzior |
| 4,102,230 A | | 7/1978 | Magnusson et al. |
| 4,113,190 A | | 9/1978 | Fudman |
| 4,184,526 A | | 1/1980 | Hanaya |
| D266,001 S | | 8/1982 | Wertheimer |
| 4,445,413 A | | 5/1984 | Ohwada |
| 4,516,560 A | | 5/1985 | Cruickshank et al. |
| 4,598,447 A | * | 7/1986 | Whyde |

(List continued on next page.)

Primary Examiner—Kenneth E. Peterson
(74) Attorney, Agent, or Firm—Maginot, Moore & Bowman

(57) ABSTRACT

A saw blade includes a blade body which defines a first side surface and a second side surface, wherein (i) the blade body has a multiplicity of discrete dimples formed on at least one of the side surfaces, (ii) the blade body is made of metal, and (iii) each of the multiplicity of dimples is formed by a process which includes the step of deforming the metal so as to create an indentation in the side surface in which the dimple is formed. The saw blade further includes a plurality of cutting teeth extending from an edge of the blade body. Moreover, the deforming step includes the step of deforming the metal with pins on a die plate of a punch press.

2 Claims, 1 Drawing Sheet

U.S. PATENT DOCUMENTS

| | | | |
|---|---|---|---|
| 4,685,181 A | * | 8/1987 | Schwartz |
| 4,744,278 A | | 5/1988 | Wright |
| 4,794,835 A | | 1/1989 | Fujiyoshi |
| 4,806,731 A | | 2/1989 | Bragard et al. |
| 4,848,205 A | | 7/1989 | Suzuki et al. |
| 5,074,179 A | | 12/1991 | Omi |
| 5,351,592 A | | 10/1994 | Bloom |
| 5,433,187 A | | 7/1995 | Hayasaka et al. |
| 5,497,684 A | | 3/1996 | Martin |
| 5,524,518 A | | 6/1996 | Sundström |
| 5,536,312 A | | 7/1996 | Madrzak et al. |
| 5,555,788 A | | 9/1996 | Gakhar et al. |
| D388,318 S | | 12/1997 | Achterberg et al. |
| 5,802,947 A | | 9/1998 | Ward, Jr. et al. |
| D426,560 S | * | 6/2000 | Texler |
| 6,145,426 A | * | 11/2000 | Ward et al. |

* cited by examiner

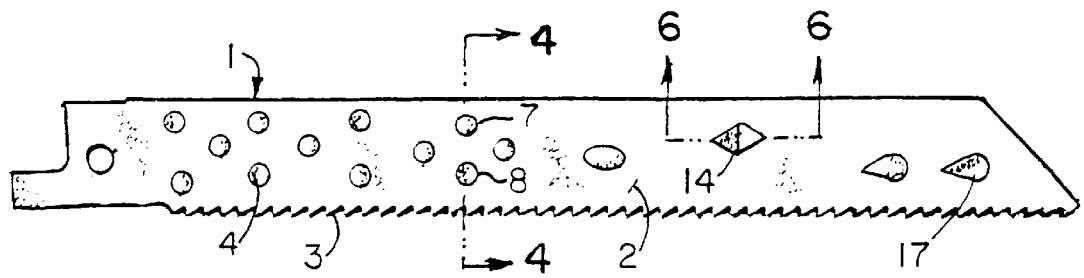
FIG.1
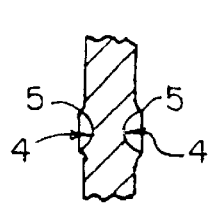
FIG.2  FIG.3  FIG.4  FIG.5  FIG.6
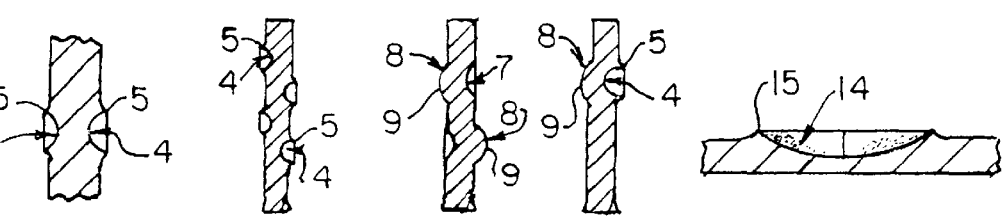
FIG.7
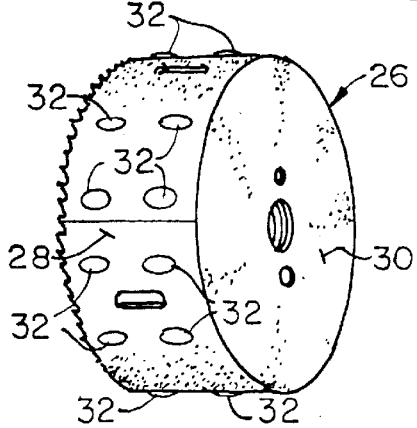
FIG.11
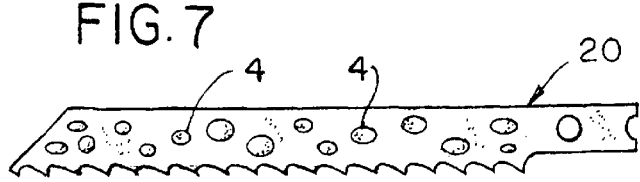
FIG.8
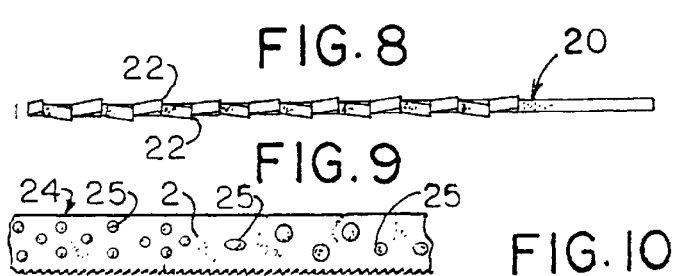
FIG.9
FIG.10
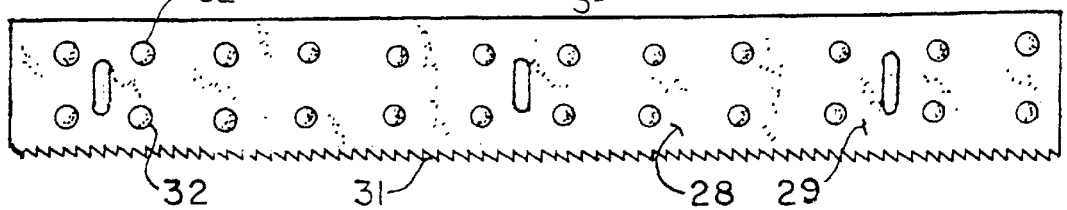
FIG.12

SAW BLADE HAVING DIMPLES FORMED BY PROCESS OF DEFORMING BLADE BODY

This application is a continuation of U.S. application Ser. No. 09/136,676, filed on Aug. 19, 1998, now U.S. Pat. No. 6,145,426, which in turn is a continuation-in-part of U.S. application Ser. No. 08/730,398, filed Oct. 15, 1996, now U.S. Pat. No. 5,802,947.

In application Ser. No. 730,398, of which this application is a continuation-in-part, dimpling of a circular saw blade to produce discrete ridges raised from the plane of the blade, is described. The dimpling process produces a cold working effect, and the raised ridges provide protection against overheating of the blade and scorching of the workpiece when a planar side surface of the blade comes into contact with a wall defining the kerf being produced by the teeth of the blade. The present application is directed to an extension of that principle and technique to linear saw blades and other applications for which those principles and techniques have utility.

Producing small, discrete, surfaces projecting from a planar surface of a jigsaw, hacksaw, or band saw blade, for example, is counter-intuitive. Logically, clearance between the kerf produced by the teeth of the blade, and the body of the blade behind the teeth would be maximized. However, it is a matter of common knowledge that the bodies of jigsaw, hacksaw or band saw blades frequently come into contact with the walls defining the kerf of a workpiece. The provision of low-profile projections from such a blade reduces the surface of contact with the kerf wall.

BRIEF SUMMARY OF THE INVENTION

In accordance with this invention, generally stated, low-profile, discrete protrusions are provided on the blade behind the teeth or cutting edge of a tool, in the form of ridges on the perimeters of indentations (concave dimples) or surfaces on the tops of domes (convex dimples). Preferably, the dimples are on both sides of the blade, although for some applications, protrusions on only one side may be desired. The dimples can be concave on one side and convex on the other, the same punching process forming both, or concave or convex dimples can be formed on both sides. Concave dimples with ridges at their perimeter can be formed in one or both sides, and convex dimples, without a corresponding concave dimple with a ridge, can be formed in one or both sides. The dimples can be of any perimetric configuration, i.e. circular, teardrop shaped, star shaped, polygonal, or even irregularly shaped, for example.

The dimples should be discrete, spaced from one another, and projecting on the order of 0.005 inches from a planar surface of the blade, although the dimensions of the dimples and their projection from the surface can vary with the application to which they are put.

The arrangement of the dimples can also be varied. For example, on a jigsaw blade, the narrowness of the blade dictates that the dimples be small and in either a linear or slightly staggered configuration. In a saber saw, band saw or hack saw, the width of the blade will permit a wider variety of pattern, or random distribution of dimples. In a hole saw, pruning saw, hand saw, or bow saw, for example, the patterns can be somewhat more open because of the greater width of the blade.

BRIEF DESCRIPTION OF THE SEVERAL VIEWS OF THE DRAWINGS

In the drawings, FIG. 1 is a view in side elevation of a saber saw blade in which, by way of illustration, dimples of various types and sizes are shown;

FIG. 2 is a fragmentary sectional view of a blade showing concave dimples formed directly opposite one another on opposite flat side surfaces of the blade, each with a ridge on its perimeter;

FIG. 3 is a fragmentary sectional view of a blade showing concave dimples formed on opposite sides but staggered with respect to one another, each with a ridge on its perimeter;

FIG. 4 is a fragmentary sectional view taken along the line 4—4 of FIG. 1;

FIG. 5 is a fragmentary sectional view of a blade in which ridged concave dimples are provided on one side, and convex dimples, on the other side;

FIG. 6 is a fragmentary sectional view of a diamond shaped concave dimple taken along the line 6—6 of FIG. 1;

FIG. 7 is a view in side elevation of a jigsaw blade in which a row of dimples has been formed;

FIG. 8 is a view in side elevation of a small saber saw blade in which dimples of various sizes and configurations have been formed;

FIG. 9 is a bottom edge view of the saw blade shown in FIG. 7, showing the staggered teeth;

FIG. 10 is fragmentary view in side elevation of a hack or band saw blade with dimples of various sizes and shapes in a random pattern;

FIG. 11 is a view in perspective of a hole saw in which dimples have been formed; and;

FIG. 12 is a top plan view of a strip used to form the blade of the hole saw of FIG. 11, before it is curled and welded.

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention.

Referring to FIG. 1 of the drawings, reference numeral 1 indicates a saber saw blade with a flat sided body 2 and teeth 3 along a narrow edge of the body. Merely by way of illustration, the body of the blade 1 is shown as having formed in it a number of different types of dimples, although normally only one type of dimple would be used on any one blade, spread along the length of the blade. FIG. 2 is an illustrative example of some of the dimples in the blade of FIG. 1, wherein concave dimples 4 with ridges 5 along their perimeters are shown as being positioned directly opposite one another on two flat sides of the blade. In FIG. 3, the dimples are shown as being staggered with respect to one another on opposite sides of the blade. FIG. 4, which is a fragmentary sectional view taken along the line 4—4, illustrates concave dimples 7 without ridges, with complementary convex dimples 8, with an outermost smooth domed surface 9, alternately on one side and the other. FIG. 5 illustrates a concave dimple 4, with a ridge 5, on one side and a complementary convex dimple 8, with an outermost smooth surface 9. FIG. 6 is a fragmentary sectional view taken along the line 6—6 of FIG. 1, showing a diamond shaped concave dimple 14 with a ridge 15 at its perimeter. Reference numeral 17 indicates teardrop shaped dimples, which can be either concave or convex.

Referring to FIG. 7, reference numeral 20 indicates a jig saw blade, with a body 21 and teeth 22. Dimples 23 in the body 21 can be of the types shown in FIGS. 2 and 3 or of the types shown in FIGS. 4 and 5. Because the body 21 is so narrow, the dimples 23 are shown as arranged in a straight line.

In FIG. 8, a different type of saber saw is illustrated, in which dimples of various shapes and sizes are arranged in a more or less random pattern.

FIG. 9 illustrates the teeth of saws provided with dimples, and in particular the jig saw blade of FIG. 7. The teeth are staggered in such a way as to produce a kerf at least slightly wider than the protrusion of the dimples, so that normally the protrusions, whether they be convex domes or ridges, do not engage the walls defining the kerf.

FIG. 10 illustrates a band or hack saw blade 24, which, merely for purposes of illustration, is shown with dimples 25 of various sizes. The dimples on the left part of the blade are shown as arranged. in a regular pattern, which would normally be the case. The dimples on the right side of the illustration are shown as of various sizes and shapes, arranged in a more or less random pattern, merely to illustrate that possibility.

FIG. 11 shows a hole saw 26 with a circular top 30 and a cylindrical blade 28 with a body 29 along a free edge of which teeth 31 extend. Dimples 32, in the embodiment shown, are convex on the exterior surface of the blade body 29. Although they are not illustrated, the dimples 32 can have counterpart concave dimples on the inner surface of the cylindrical blade body, which can be of the type shown in FIG. 5, to provide protrusions on the inner surface, as well as on the outer, or the hole saw can be provided with any of the other types of dimples that have been illustrated or described.

FIG. 12 illustrates the blade 28 of the hole saw 26 as it is made before it is curled and welded at its free ends to form a cylinder as indicated in FIG. 11. This simplifies the formation of the dimples 32.

It will be apparent to those skilled in the art that the dimpling can be applied to a wide variety of tools beyond those specifically illustrated, as has been indicated heretofore. In a toothless blade, particularly a food slicing blade, the dimples are preferably made entirely convex, or, if complementary concave dimples are formed in the process of producing the convex dimples, at least making the complementary concave dimples without ridges, to make cleaning easier. Preferably, in every case, the dimples are formed with a punch press, which gives the benefit of the cold-working described in application Ser. No. 730,398. Pins, set in a die plate, can be used to form the concave dimples, and if convex dimples are to be formed, to form the concave dimples on one side and complementary convex dimples on the other at the same time. It is possible to form the dimples in a rolling process either in the course of manufacturing stock of which the blades are made, or subsequently. The dimples can be produced on only one side of a blade that is expected to be used in such a way that only one side is likely to come into contact with a kerf wall. Numerous other variations in the tools of this invention and the method of their manufacture within the scope of the appended claims will become apparent to those skilled in the art in the light of the foregoing disclosure.

As various changes could be made in the above constructions without departing from the scope of the invention, it is intended that all matter contained in the above description or shown in the accompanying drawings shall be interpreted as illustrative and not in a limiting sense.

What is claimed is:

1. A saw blade, comprising:

a blade body which defines a first side surface and a second side surface, wherein (i) said blade body has a multiplicity of discrete dimples formed on at least one of said side surfaces, (ii) blade body is made of metal, and (iii) each of said multiplicity of dimples is formed by a process which includes the step of deforming said metal so as to create an indentation in said side surface in which said dimple formed; and a plurality of cutting teeth extending from an edge of said blade body, wherein said deforming step includes the step of deforming said metal with pins on a die plate of a punch press, wherein each of said multiplicity of dimples defines a perimeter, wherein each of said multiplicity of dimples includes a ridge which is located at said perimeter, and wherein said ridge extends above said side surface of said blade body in which said dimple is formed.

2. The saw blade of claim 1, wherein said blade body and said cutting edge are configured to form any one of the following group: a jig saw blade, a saber saw blade, a hack saw blade, a bow saw blade, a hand saw blade, a bone saw blade, a pruning saw blade, a keyhole saw blade, a miter saw blade, and a band saw blade.

\* \* \* \* \*